United States Patent [19]

Poujois

[11] Patent Number: 5,274,224
[45] Date of Patent: Dec. 28, 1993

[54] APPARATUS FOR THE DETECTION OF NON-FOCUSABLE RADIATION FORMED BY JOINING A PLURALITY OF IMAGE DISPLAYS OR SHOOTING MATRIXES IN A SIDE BY SIDE ARRANGEMENT

[75] Inventor: Robert Poujois, Sinard, France

[73] Assignee: Commissariat a l'Energie Atomique, Paris, France

[21] Appl. No.: 917,454

[22] Filed: Jul. 21, 1992

[30] Foreign Application Priority Data

Jul. 26, 1991 [FR] France .......................... 91 09503

[51] Int. Cl.⁵ ........................ H01J 40/14; H01L 27/14
[52] U.S. Cl. ........................ 250/208.1; 250/370.08; 257/444; 257/291; 345/87
[58] Field of Search ........... 250/208.1, 370.09, 370.08, 250/370.14; 257/226, 231, 291-293, 444; 340/719, 784, 765; 358/213.17, 213.11

[56] References Cited

U.S. PATENT DOCUMENTS

| | | | |
|---|---|---|---|
| 3,996,599 | 12/1976 | King | 257/226 |
| 4,253,120 | 2/1981 | Levine | |
| 4,445,117 | 4/1984 | Gaalema et al. | 257/293 |
| 4,571,626 | 2/1986 | Yamada | 257/444 |
| 4,799,094 | 1/1989 | Rougeot | 257/291 |
| 4,862,237 | 8/1989 | Morozumi | 257/444 |
| 5,043,820 | 8/1991 | Wyles et al. | 250/208.1 |
| 5,105,087 | 4/1992 | Jagiclinski | 250/370.09 |
| 5,120,960 | 6/1992 | Halvis | 250/370.08 |
| 5,122,649 | 6/1992 | Murayama et al. | 250/208.1 |
| 5,132,541 | 7/1992 | Conrads et al. | 257/444 |
| 5,184,018 | 2/1993 | Conrads et al. | 250/208.1 |

FOREIGN PATENT DOCUMENTS

| | | |
|---|---|---|
| 0086619 | 3/1983 | European Pat. Off. |
| 0245147 | 11/1987 | European Pat. Off. |
| 0421869 | 4/1991 | European Pat. Off. |
| 3835700 | 4/1990 | Fed. Rep. of Germany |
| 60-84870 | 5/1985 | Japan .................. 257/444 |
| 63-086479 | 8/1988 | Japan |
| 63-268267 | 11/1988 | Japan |
| 1596359 | 9/1990 | U.S.S.R. ............ 250/208.1 |

Primary Examiner—Michael Messinger

[57] ABSTRACT

The invention relates to an image display or shooting apparatus, in which several matrixes are joined edge to edge in accordance with the same plane, so as to form a large apparatus. The addressing circuits of the rows and columns of said matrixes are subdivided into addressing subcircuits and located in areas which are naturally inactive, or which are made deliberately inactive, i.e. areas having no active elements. In the case of shooting or photographing, in order to make the areas inactive, the active elements of certain pixels are destroyed in order to install in their place the addressing subcircuits, the information normally contained in the destroyed pixels being replaced by a reconstitution information obtained by averaging the information of adjacent intact pixels. The invention more particularly applies to the retinas of cameras used for the detection of non-focusable radiation and which are more particularly employed in radiology and nuclear imaging.

9 Claims, 7 Drawing Sheets

APPARATUS FOR THE DETECTION OF NON-FOCUSABLE RADIATION FORMED BY JOINING A PLURALITY OF IMAGE DISPLAYS OR SHOOTING MATRIXES IN A SIDE BY SIDE ARRANGEMENT

BACKGROUND OF THE INVENTION

1. Field of the Invention

The present invention relates to a large image display or shooting apparatus, also referred to as a retina in the case of photography.

It more particularly applies to retinas of cameras used in the detection of non-focusable radiation, such as gamma or X-rays more particularly used in the medical fields of radiology and nuclear imaging. The invention also has industrial applications, such as in particular the analysis of the state of metal parts and the production of display screens.

In the case of photography and for applications where the radiation is not focusable, it is necessary for the retina to be of the same size as the object projected by the particle source (gamma or X-rays), whereby the image can have 4,000×4,000 elementary elements of the retina. The known retinas used in the apparatus according to the invention have a size between approximately 1 and 16 $dm^2$, which makes it necessary to organize several of these retinas together to obtain one large retina.

2. Description of the Related Art

An apparatus in which several of these retinas are associated is described in French patent application FR-A-2 652 655. According to the latter, the retinas used are organized in tile-like manner, i.e. they are partly superimposed.

Thus, the known image display or shooting apparatuses have a matrix of elementary elements or pixels having a sensitive surface adapted to a particular radiation (infrared, visible, X or gamma rays) or to a chosen display type.

This matrix is subdivided into an active matrix constituted by microelectronic circuits and conductive rows and columns, as well as a sensitive surface constituted by the same number of sensitive elements as there are elements in the matrix.

These sensitive elements can be smaller than the spacing of the matrix. They can also be arranged either on the same plane as the active matrix, (i.e. integrated into the latter), or on a different plane (the most frequently encountered case), when the said sensitive elements are arranged on the surface of the integrated circuit constituting the active matrix. No matter whether it is a shooting apparatus or camera, or an image display apparatus, their operation is roughly the same.

A camera has a matrix, in which each of the elementary elements comprises a sensitive element, such as a photodiode. The elementary elements of the matrixes are arranged in accordance with rows and columns, the sensitive elements being connected to microelectronic circuits and to conductive rows and columns. Under the effect of an incident radiation, the sensitive elements supply electrical signals transformed into a video signal by microelectronic circuits.

An image display apparatus or screen, receives a video signal on the inputs of microelectronic circuits, transforming the same into electrical signals applied to the sensitive elements of the screen by means of conductive columns and rows. The sensitive elements of the screen, arranged in the form of rows and columns, comprise an electrooptical material (e.g. liquid crystal), whose optical property is modified under the effect of the electrical signal applied thereto in order to permit the display of an information.

Throughout the remainder of the description particular reference will be made to a camera, knowing that the invention more particularly applies to the latter. Throughout the remainder of the text retina elementary elements, elementary points, image points or pixels are used in a random and arbitrary manner.

Moreover, the aforementioned microelectronic circuits are subdivided into conditioning circuits and addressing circuits. In the case of photography, the conditioning circuits essentially comprise, for each associated sensitive element, a switch connected on the one hand to said element by an amplifier and on the other to a conductive column and row and optionally an initialization circuit for the sensitive element. In the case of image display, these conditioning circuits essentially comprise, for each sensitive element, a switch connected on the one hand to the said element and on the other to a conductive column and line. Moreover, in the case of image display or shooting, the addressing circuits are subdivided into column addressing circuits connected to the conductive columns of the matrix and into row addressing circuits connected to the conductive rows of the matrix.

Figure 1:
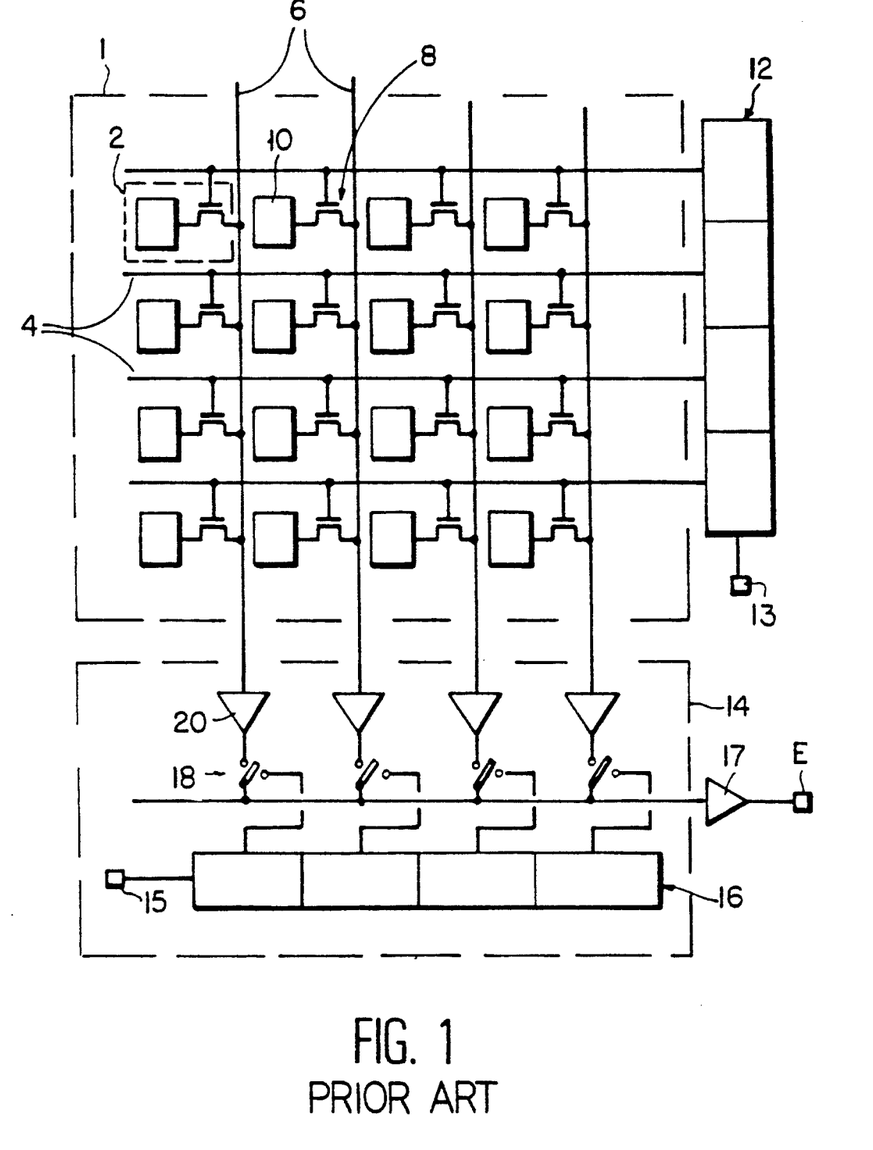
FIG. 1, already described, diagrammatically a known matrix.

FIG. 1 shows a known matrix used in the prior art apparatus and whose operation is virtually the same as the matrixes used in the apparatus according to the invention.

For simplification reasons, the matrix shown in FIG. 1 only has a limited number, i.e. sixteen pixels, i.e. sixteen sensitive elements, each associated with a microelectronic circuit. Only a relatively brief description of said matrix will be given, because it is known.

In a more detailed form, the matrix is constituted by a sensitive area 1 having juxtaposed pixels 2 connected to conductive rows 4, conductive columns 6 and addressing circuits 12, 14. The pixels 2 are located at the intersections of the conductive rows and columns. Each pixel 2 has, in the present example, a sensitive element 10 and a conditioning circuit 8 reduced in this case to a selection switch constituted e.g. by a transistor connected to a conductive row 4, to a conductive column 6 and to said sensitive element 10.

As shown in FIG. 1, said sensitive element 10 can occupy part of the pixel surface, when it is produced in the same substrate as the conditioning and addressing circuits associated therewith, or at the most the entire pixel when the sensitive element is produced from a separate layer from that of the conditioning and addressing circuits. In the latter case, the sensitive elements are positioned above said circuits and the row and column conductors.

The transistors 8 are sequentially addressed row by row via a row addressing circuit 12 and a column addressing circuit 14. The row addressing circuit 12 selects the rows 4 in successive manner by means of a row clock 13, by raising the transistors to a given potential making it possible to make said transistors conductive.

In the case of photography, the column addressing circuit 14, for the selection time of a row, successively connects, by means of the column clock 15, the transistors 8 of said row to the matrix video output E, whilst closing the switches 18 by means of a control circuit 16

(such as a shift register) connected to the said switches. The electrical signal from the video output E therefore comes from the sensitive element 10 selected by means of the switches 18 after having been amplified by the amplifiers 20.

Therefore the column addressing circuit 14 can simultaneously collect the signals of all the sensitive elements of an addressed row. In this case, the amplifiers 20 incorporate a memory which can be sequentially read by the circuit 16.

The addressing circuits 12 and 14, integrated in the active matrix, generally occupy a 100 to 200 micron wide band on the edges of the matrix. The existence of these bands containing the addressing circuits would create shadow strips, if several such matrixes were merely juxtaposed in order to create a large screen.

The very existence of said bands has led the inventors of the previously described prior art to organize the said matrixes in a manner comparable to that of the tiles on a house roof. Thus, each matrix has addressing circuits located on one or two edges of the matrix preventing all the edges from being formed by the sensitive area. Two possibilities are then offered in the said prior art, either the arrangement of the matrixes in such a way that their sensitive areas are juxtaposed, which limits the number of matrixes to four or n×2 (n being the number of aligned matrixes on a row) if the addressing circuits are grouped on a single edge, or arranging the matrixes in tile-like manner.

In the latter prior art construction, the sensitive area of a matrix covers an addressing circuit of another matrix. Therefore the matrixes are assembled according to different planes and overlap one another.

This organization of the matrixes leads to the disadvantage of offering shadow areas and pixel information losses due to the thickness of the different planes of the matrixes. These shadow areas can be limited by chamfering the edge of the sensitive areas overlapping the addressing circuit, said chamfering process being very difficult and costly.

SUMMARY OF THE INVENTION

The object of the present invention is an image display or shooting apparatus in which a plurality of matrixes can be organized according to the same plane, i.e. joined edge to edge. Thus, the addressing circuits which, in the prior art, border the sensitive area of the matrix are arranged differently in the matrixes according to the invention.

The addressing circuits of each matrix are integrated on a semiconductor substrate (e.g. of silicon), according to known microelectronics principles, such as bipolar or CMOS technologies. This integration of the addressing circuits saves space compared e.g. with printed addressing circuits.

More specifically, the present invention relates to large image display or shooting apparatus incorporating a plurality of image display or shooting matrixes respectively having sensitive elements connected by conditioning circuits to conductive rows and columns, which are themselves connected to the addressing circuits of said matrixes, characterized in that said matrixes are joined edge to edge, the addressing circuits of a matrix being place below the sensitive elements of said matrix.

Advantageously, each area located below a sensitive element has on the one hand an active area containing a conditioning circuit and part of a conductive row and column associated with said sensitive element and on the other hand an inactive area, the addressing circuits of the matrix being at least partly installed in said inactive areas.

Moreover, the inactive area of a sensitive element is advantageously assembled with at least one other inactive area, so as to create inactive areas of significantly greater size.

In the case of photography, certain active areas can be made inactive by the destruction of their respective conditioning circuit, the addressing circuits of the matrix then being at least partly installed in said areas which have been made inactive.

The term destruction is incorrectly used here, because in reality in order to make an area inactive the initially intended electronics are not installed in said area. An area made inactive and which is also referred to as the destroyed area, is assembled to at least one other area made inactive, so as to create areas made inactive having a significantly greater size.

Thus, the cameras incorporate means, outside the active matrixes, for reconstituting the shooting informations to be associated with the sensitive elements having a destroyed area. These informations are obtained by averaging informations from adjacent sensitive elements having an active area.

Advantageously, the addressing circuits of the matrixes are subdivided into addressing subcircuits installed in several inactive areas and/or areas which have been made inactive.

According to an embodiment of the invention, the matrixes have an etched metal layer partly covering the rear face and edges of said matrixes and ensuring an electrical connection of said matrixes to external elements, such as processing means and supplies.

BRIEF DESCRIPTION OF THE DRAWINGS

According to another embodiment of the invention, the matrixes have plated-through holes traversing said matrixes and ensuring an electrical connection of said matrixes by their rear face. These plated-through holes are preferably located in the destroyed areas of the matrix.

The invention is described in greater detail hereinafter relative to non-limitative embodiments and with reference to the attached drawings, wherein show.

In the apparatus according to the invention, the addressing circuits are placed beneath the sensitive elements of the matrix. However, these addressing circuits may require, essentially in the case of photography or shooting, a larger space than that which is available beneath the sensitive elements, i.e. larger than the inactive area. Advantageously, the invention makes it possible in the case of shooting, to destroy the conditioning circuits of certain image elements in order to introduce in their place elements of addressing circuits and optionally plated-through holes permitting the connection of matrixes to external processing circuits. The real informations received by these deteriorated image elements are lost. However, the invention makes it possible to replace said informations by replacement informations obtained from those contained by adjacent, undeteriorated image elements.

Figure 2:
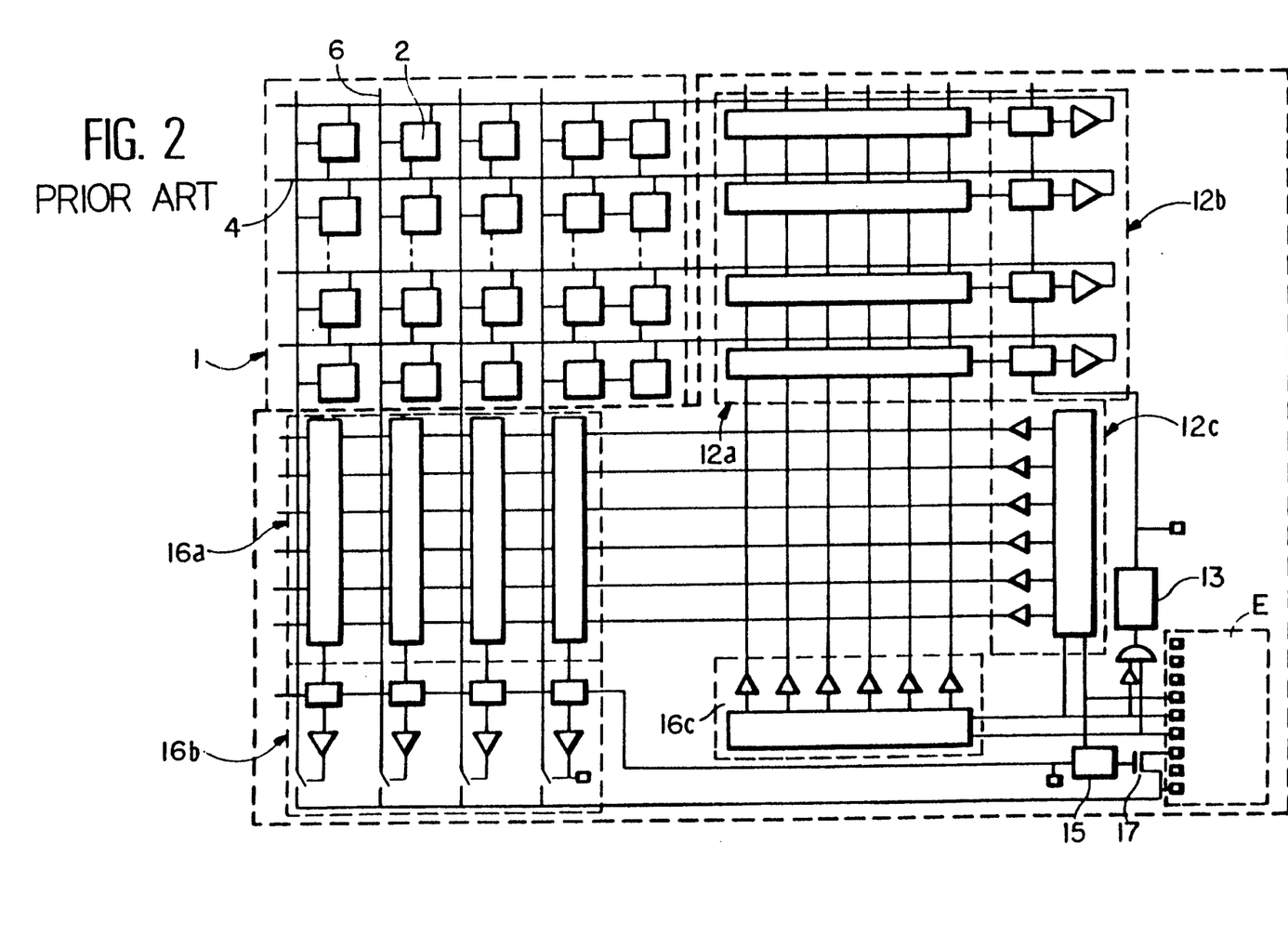
FIG. 2 Diagrammatically another known matrix used in the case of photography.

FIG. 2 shows an example of a commercial matrix, in which it is wished to locate addressing circuits below the sensitive area. In FIG. 2, most of the references are identical to those of FIG. 1. Thus, the matrix of FIG. 2 has an operation similar to that of the matrix of FIG. 1. However, its addressing circuits differ at least partly from those of the matrix of FIG. 1.

Thus, in FIG. 2, it is possible to see the sensitive area 1 of the matrix, its row addressing circuit 12a–12c, its column addressing circuit 16a–16c, the row clock 13, the column clock 15, the output amplifier 17 and the matrix output connections E. More specifically, the row addressing circuit comprises, for each conductive row 4, a row decoding circuit 12a, a counter 12c and a circuit 12b constituted by a sampler and an amplifier. In parallel, the column addressing circuit comprises, for each conductive column 6, a column decoding circuit 16a, a counter 16c and a circuit 16b having a sampler and an amplifier. At its sensitive area 1, such a matrix has several matrix elements 2.

Figure 3:
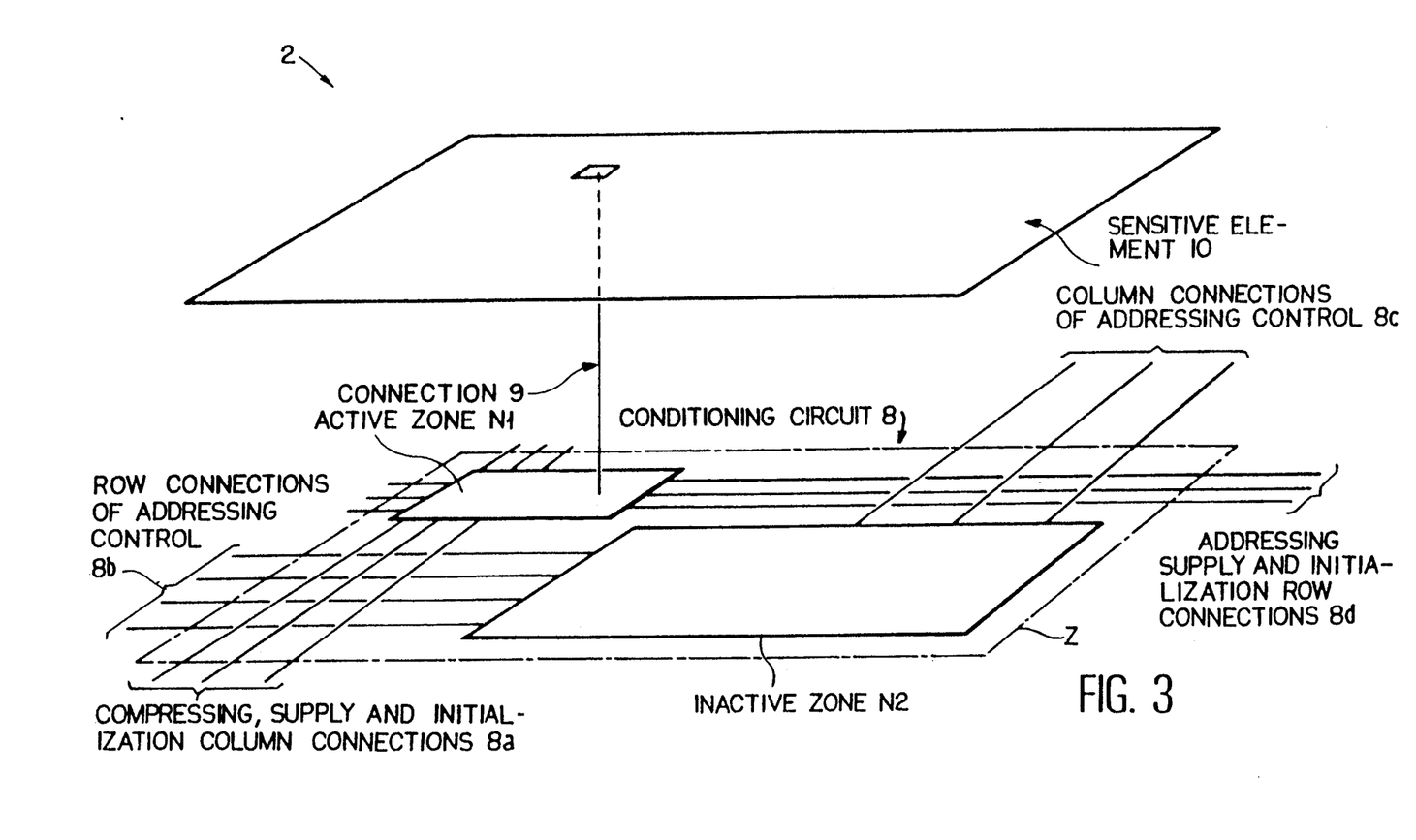
FIG. 3 A diagram of a matrix element according to the invention.

FIG. 3 shows one of the elements 2 of the matrix, when the addressing circuit elements have been included. This matrix element 2 comprises a sensitive element 10 belonging to the sensitive area 1 referred to hereinbefore and a conditioning circuit 8, the sensitive element 10 and the circuit 8 being electronically connected by a connection 9.

More specifically, the complete area Z corresponding to the surface of a pixel and located beneath the element 10 (which has a size equal to or smaller than said area) comprises addressing, supply and initialization column connections 8a of the circuit 8 and addressing, supply and initialization row connections 8d of the circuit 8.

Moreover, two zones appear within the area Z, namely N2, which is naturally inactive, i.e. it does not normally have electronic elements, and the active zone N1 containing the circuit 8 and which can be made inactive, in certain cases, by eliminating the electronic elements located there, i.e. of the conditioning circuit of the sensitive element 10.

In the apparatus according to the invention, the addressing circuits are mainly located in the matrix area or zones N2. In FIG. 3, in area N2 has been located part of the matrix addressing circuit with, in area Z, row connections 8b of the addressing control and column connections 8c of the addressing control. To facilitate the installation of said addressing circuits, they are generally subdivided into addressing subcircuits constituted by one or more addressing elements, so as to more easily locate subcircuits in the initially inactive areas N2 of the matrix. Preference is given to the installation of the addressing control circuits in areas N2 or in groupings of areas N2, because this does not destroy an image point. The areas N1 which have been made inactive have no active elements and are therefore associated with pixels deprived of their electronics, i.e. defective pixels. In the zones N1, addressing circuits will only be installed in the areas of the matrix which are particularly dense and for installing there e.g. exit hubs. The inactive zones N1 must also be located on pixels which are separated or aligned with one another in order to permit the reconstitution of the information associated with said defective pixels with the aid of adjacent pixels.

Figure 4:
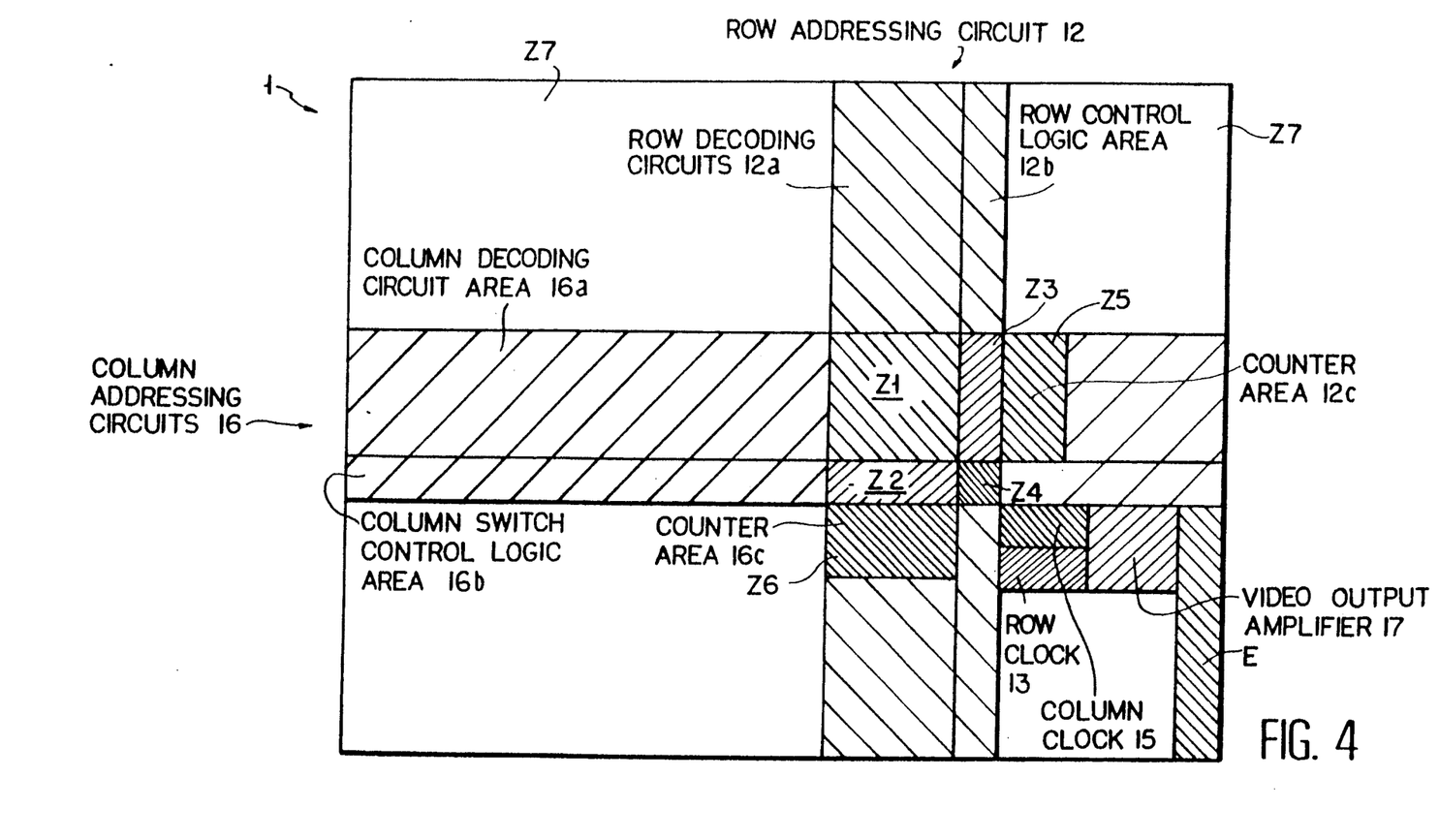
FIG. 4 An arrangement example according to the invention of the addressing circuits in the matrix.

FIG. 4 shows an example of the arrangement of the addressing circuits in the matrix for a matrix corresponding to that of FIG. 2.

The drawing shows the sensitive area of the matrix beneath which it is wished to locate the hatched addressing circuits. The row addressing circuit 12 has, as in FIG. 2, an area containing row decoding circuits 12a, a row control logic area 12b and a counter area 12c. In parallel, the column addressing circuits 16 have a column decoding circuit area 16a, a column switch control logic area 16b and a counter area 16c. It is also possible to see the sensitive area of the matrix, i.e. that containing the pixels.

It can be seen that the row addressing areas 12a, 12b, 12c and the column addressing areas 16a, 16b, 16c intersect in areas Z1, Z2, Z3, Z4, Z5 and Z6, where installation is difficult. Conversely, a priori, no installation is necessary beneath the area Z7. Area Z1 remains the easiest for installation among the areas Z1, Z2, Z3, Z4, Z5 and Z6, because the decoding gates are distributed at the rate of one MOS transistor per pixel. Area Z4 is much more difficult from the installation standpoint, because the control logic has between approximately 10 and 20 transistors per row or column, which is not possible in an average size pixel of approximately $100 \times 100$ microns. Thus, for installing the area Z4 beneath the matrix, it would be necessary to find an inactive area of significant size in order to be able to locate all the elements contained in said area Z4 and/or subdivide the control logic so that it could be dispersed over a certain number of inactive areas. In the same way, the areas Z5 and Z6 containing 12c and 16c incorporating the counter stages are difficult to install and it is necessary to regroup the areas N2 in 4 or more and in certain cases areas N1 are used.

An ancillary logic containing the row clock 13, the column clock 15, the video output amplifier 17 and output hubs E are included in the addressing circuits to be installed beneath the matrix. In general terms, areas Z1 to Z6 shown in FIG. 4 can be relatively easily installed from normally inactive and possibly regrouped areas when the pixels have a size of approximately $150 \times 150$ microns. However, if the matrix is constituted by very small pixels, approximately $80 \times 80$ microns, said areas Z1 to Z6 cause serious installation problems and also make it necessary to "kill", i.e. destroy, the electronics of separate or aligned pixels, in order to render inactive active areas and thus increase the surface available for installation beneath the sensitive elements.

After the installation of the addressing subcircuits, the informations associated with these defective pixels are reconstituted so as to allow a good display of the image.

Figure 5:
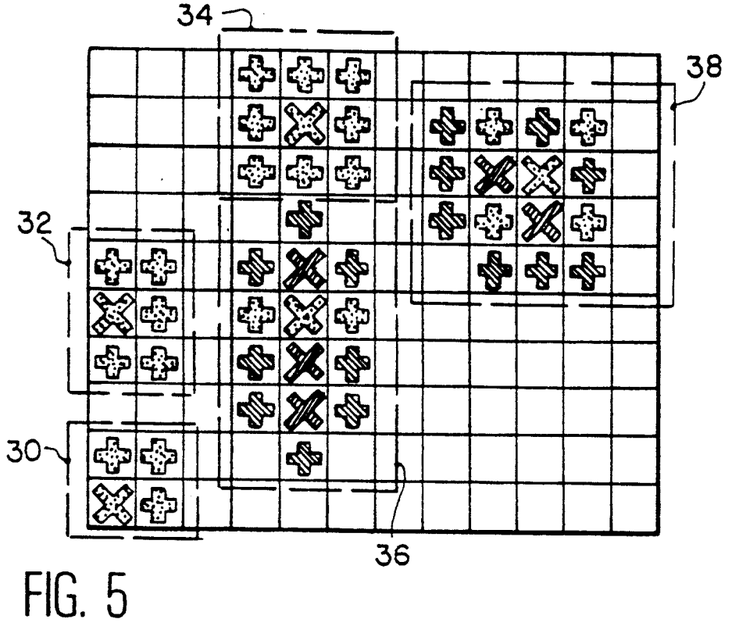
FIG. 5 Examples of the reconstitution of destroyed pixels.

FIG. 5 shows an example of the reconstitution of pixels, i.e. a matrix is shown which contains $10 \times 12$, i.e. 120 pixels. Among these pixels there are both intact pixels consequently having active areas of the matrix and defective pixels, whereof the electronics of the active zones N1 have been destroyed in order to form supplementary inactive areas in the matrix. The hatched X's represent defective pixels and the hatched crosses intact pixels adjacent to defective pixels. The dotted crosses represent the said adjacent pixels and which are used for reconstituting the defective pixels and the dotted X's represent the repaired pixels, i.e. those which have been reconstituted.

This pixel reconstitution takes place by attributing to the defective pixel a reconstitution information obtained by averaging informations of adjacent intact pixels. This procedure is known to the Expert and consists of averaging, by calculating means outside the apparatus, informations contained in adjacent intact pixels, said informations being in particular the value of the charge received by said adjacent pixels. This pixel reconstitution means is used when the defective pixels are in the form of isolated points surrounded by intact pixels, or in the form of rows or columns, whose parallel rows are those constituted by intact pixels.

FIG. 5 shows different cases in which defective pixels have been repaired from adjacent intact pixels. The block 30 shows a repaired pixel surrounded by three intact pixels used for repairing the pixel which was originally defective. The block 32 represents another repaired pixel example, said pixel being surrounded by five intact pixels used for repairing the defective pixel. The block 34 is a third example of a defective pixel, which has been repaired by averaging eight intact adjacent pixels. The block 36 is an example where the defective pixels are in columns, each defective pixel being surrounded by at least two adjacent intact pixels, used for the averaging of said defective pixels. In block 36 a single defective pixel has been repaired. The block 38 also shows three defective pixels aligned in pairs respectively according to a row and a column, one of the said pixels having been repaired by averaging four adjacent intact pixels arranged symmetrically to one another.

Thus, the addressing circuits which have been subdivided into addressing subcircuits can be installed in normally unoccupied areas N2 and in areas N1 which have been made inactive, i.e. areas N1 freed from the electronic elements of the pixel. In particularly dense areas, such as area Z4, the addressing subcircuits will be installed in the entire surface of the hatched X's and dotted X's. They will also be installed in areas N2, namely in part of the surface of the other pixels.

Figure 6:
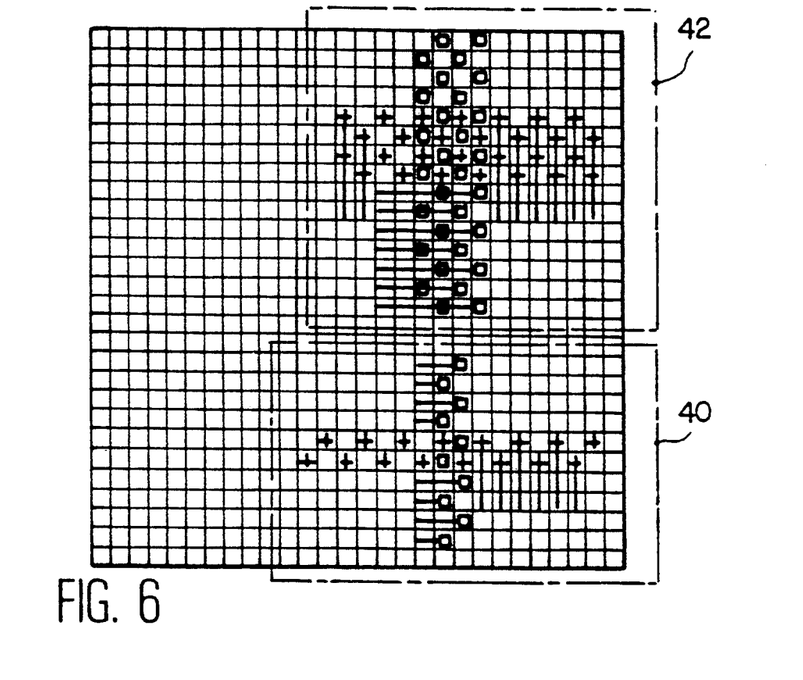
FIG. 6 Two examples of the arrangement of addressing circuit elements in a matrix without any pixel destruction.

FIG. 6 shows two examples of the arrangement of the elements of the addressing circuit in a matrix, in which no pixel has been deliberately destroyed. The crosses represent elements of the column addressing circuit and the squares represent elements of the row addressing circuit. Both the crosses and the squares are extended by a line respectively indicating all the column or row on which are located said crosses and squares.

The block 40 shows a matrix below which the pixels have not been destroyed, the elements of the row addressing circuit and the elements of the column addressing circuit being appropriately subdivided beneath the matrix. Such a matrix is e.g. of the type in which the pixels have a relatively large size, e.g. 150×150 microns, in order to permit the location of an addressing subcircuit beneath a single pixel of the matrix.

The block 42 represents another example of the arrangement of elements of the addressing circuit in a matrix, in which no pixel has been destroyed. The matrix of this example is possibly a matrix in which the pixels have a smaller size, e.g. 100×100 microns and in which the free space beneath a single pixel is not adequate to install an addressing subcircuit. It is therefore necessary to reserve two locations, i.e. the free areas beneath two pixels in order to install a single addressing subcircuit.

Figure 7:
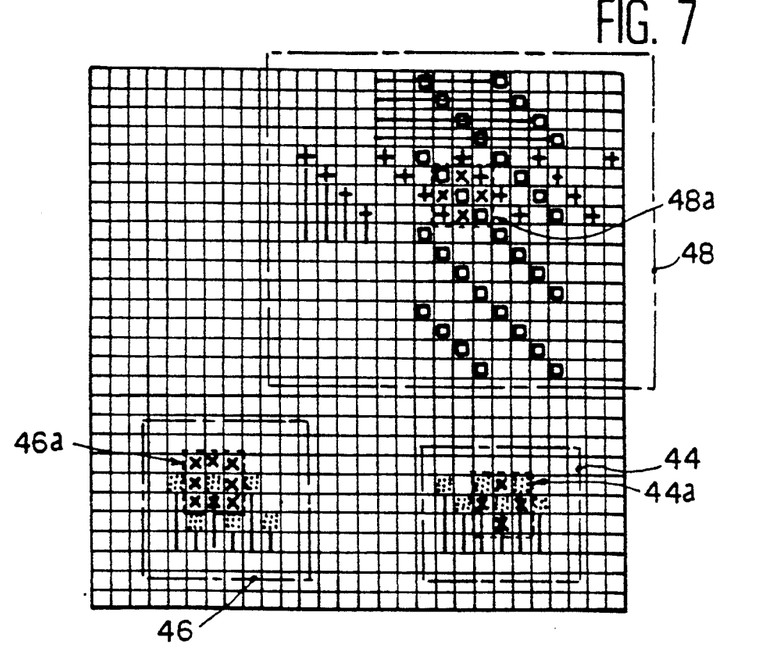
FIG. 7 Different arrangements of elements of addressing circuits and output hubs in a matrix with pixel destruction.

FIG. 7 shows examples of arrangements of addressing circuits, as well as output hubs in a matrix, where pixels have been destroyed. On the three blocks 44, 46 and 48, the ordinary squares represent the row addressing circuit elements, the crosses the column addressing circuit elements and the X's the pixels which have been averaged in order to repair the destroyed pixels, whereas the dotted squares represent the output hubs connected to plated-through holes for passing out from the rear face. The blocks 44a, 46a and 48a represent all the pixels used for the repair of the destroyed pixels, which are in the centre of the said blocks.

Block 44 represents an example in which it is possible to see output hubs located beneath the pixels which have been deliberately destroyed. The output hub in the centre of the area 44a is surrounded by four pixels, whose information has been averaged in order to allocate the average information obtained in this way to the destroyed pixel.

Block 46 represents an example where six output hubs have been located beneath destroyed pixels. The output hub located in the centre of the summation area represented by the area 46a is surrounded by pixels whose information will be averaged to obtain an average information to be attributed to the destroyed pixel beneath which has been located the said output hub.

Block 48 represents row addressing circuit elements, as well as column addressing circuit elements installed beneath destroyed pixels. The area 48a represents three row addressing circuit elements, as well as two column addressing circuit elements, one of the row addressing circuit elements being surrounded by four intact pixels, which are averaged to obtain an information to be allocated to the pixel below which has been positioned the said row addressing circuit element.

It can been seen that, compared with FIG. 6, the elements constituting the row and column addressing circuits are more widely dispersed, so that a destroyed pixel is surrounded by intact pixels in order to be able to obtain an average of the informations contained by said intact pixels, said average information being attributed to the destroyed pixel.

Figure 8:
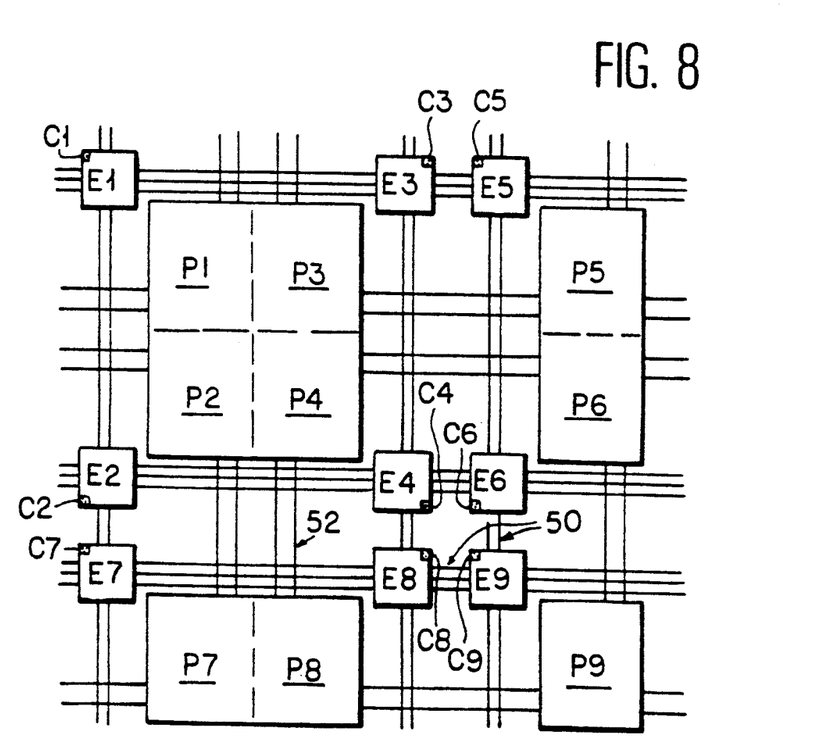
FIG. 8 An exemplified topological arrangement in a matrix.

In FIG. 8 is shown a topological arrangement making it possible to place larger inactive areas beneath the matrix. Thus, rather than subdivide the addressing circuits into very small addressing subcircuits or addressing elements in order to be able to install them below the pixels, it is of interest to group the inactive areas N2 located beneath the matrix into inactive areas of larger sizes. For this purpose, regrouping takes place of the electronics of adjacent pixels in the same active area in order to free a larger inactive area, in which the addressing subcircuits are located. This grouping of the inactive areas consequently makes it possible to less finely subdivide the addressing circuits, which limits the number of interconnections between the different addressing subcircuits.

It can be seen that the active areas E3/E5, E2/E7, E4/E6/E8, E9 of the pixels grouped by fours in most of the matrix, the connections C1, C2, C3, etc. of each pixel being positioned facing the closest adjacent pixels and connected by links 50 to the connections of said adjacent pixels. This grouping of four pixel electronics makes it possible to free larger inactive areas N2 interconnected by links 52, said areas being constituted by inactive areas N2 P1/P2/P3/P4, P5/P6 and P7/P8. In such inactive areas, it is possible to install at least four times larger addressing subcircuits than those which would have been installed in a single area N2 (P1 or P2 or P3 or etc.).

Figure 9:
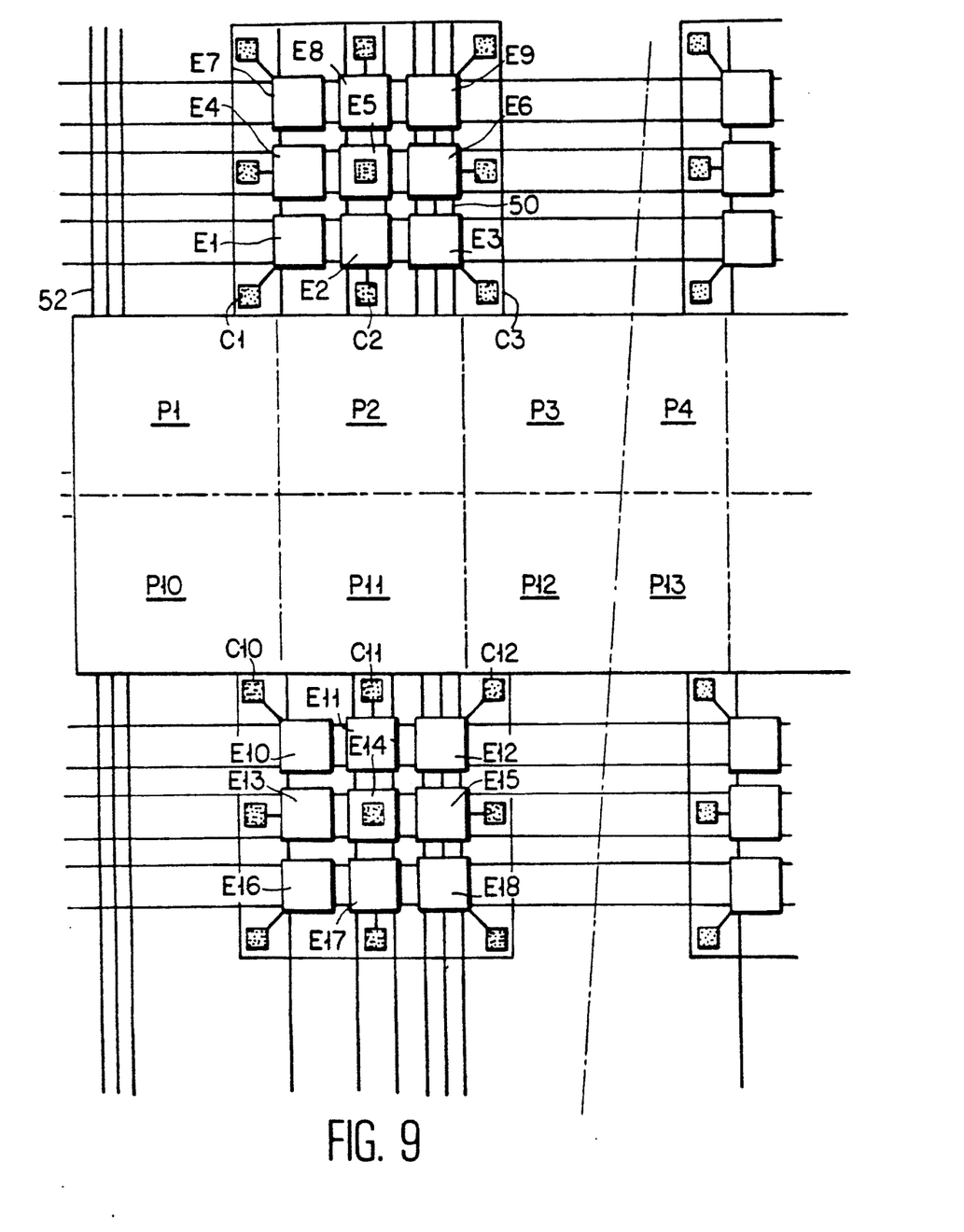
FIG. 9 Another topological arrangement example in a matrix.

FIG. 9 shows another topological arrangement example, in which the active areas N2 E1, E2, . . . , E9 and E10, . . . E18 of the pixels are grouped in nines and not fours as in FIG. 8, so as to obtain an inactive area N2 P1, P2, P3, P10, P11, P12, etc., which is even larger than that available in FIG. 8. Thus, an inactive free area is obtained which is formed by two strips (a row strip and a column strip) of double width compared with the width of a single inactive area N2. The lines 50 represent the links between the connections C1, C2, C3, etc. of the pixels between one another and the lines 52 represent the links between the addressing circuits.

Thus, the aforementioned matrixes, having their addressing circuits installed below their sensitive area, so that a plurality of matrixes can be juxtaposed or more precisely joined edge to edge. The matrixes are then connected by not shown output connections positioned facing the matrix.

A first type of output connection consists of a metal layer deposited and etched over part of the rear surface and edges of each matrix, which produces the connection to the rear face of the matrix. Another type of output connection consists of a plated-through hole located in the pixels of the matrix, each hole being electrically connected to an output wire on the rear face of the matrix. These plated-through holes can occupy areas N1 made inactive by the destruction of pixels.

There are also several embodiments for the row and column addressing circuits. In a first embodiment use is made of a shift register, like the matrix shown in FIG. 1. A second, preferred embodiment consists of using a counter associated with a decoder, as shown in FIG. 2. Thus, this embodiment, with a counter and decoder, is more advantageous because it makes it possible, in a matrix of 1024×1024 points, to only destroy 10 instead of 1024 points for a shift register. Moreover, even if the use of a counter requires more decoding circuits than a shift register, said decoding circuits can be more easily integrated under the sensitive area, because they are constituted by MOS transistors in series or parallel, said transistors being easily integratable at a rate of one transistor per pixel.

Moreover, the defective pixel repair process used in the apparatus according to the invention is also of interest for repairing technologically defective points, when the latter can easily be located, i.e. when they are either isolated or aligned, which is very often the case for technological faults.

I claim:

1. A large image display or shooting apparatus incorporating a plurality of image display or shooting matrixes having sensitive elements connected, by conditioning circuits, to conductive rows and columns, which are themselves connected to addressing circuits of the said matrixes, comprising said matrixes having edges and being joined edge to edge at said edges, the addressing circuits of a matrix being integrated onto a semiconductor substrate and located in areas positioned beneath said sensitive elements of the said matrix, each area located beneath a sensitive element has an active zone containing a conditioning circuit and part of a conductive row and column associated with said sensitive element and an inactive zone, the addressing circuits of the matrix being at least partly located in said inactive zones.

2. Apparatus according to claim 1, wherein the inactive zone of a sensitive element is assembled with at least one other inactive zone, so as to create much larger inactive zones.

3. Apparatus according to claim 1, wherein certain active zones are made inactive by the destruction of their respective conditioning circuit, the addressing circuits of the matrix being at least partly located in said zones which have been made inactive.

4. Apparatus according claim 3, wherein the zone which has been made inactive of a sensitive element is assembled with at least one other zone made inactive, so as to create zones made inactive of a much larger size.

5. Apparatus according to claim 3, wherein it comprises means for reconstituting information associated with the sensitive elements having a zone made inactive, said information being obtained by averaging information from adjacent sensitive elements having an active zone.

6. Apparatus according to claim 1, further comprising zones which can be made inactive and wherein the addressing circuits of the matrixes are subdivided into addressing subcircuits installed in several of said inactive zones or said zones made inactive.

7. Apparatus according to claim 1, wherein the matrixes have a rear face and incorporate an etched metal layer covering part of said rear face of said matrixes and ensuring an electrical connection between said metal layer and said rear face of said matrixes.

8. Apparatus according to claim 1, wherein the matrixes incorporate plated-through holes traversing said matrixes and ensuring an electrical connection thereof.

9. Apparatus according to claim 8, further comprising matrix zones which have been made inactive and wherein the plated-through holes are located in said matrix zones which have been made inactive.

* * * * *